US010325260B2

(12) United States Patent
Mundhra et al.

(10) Patent No.: US 10,325,260 B2
(45) Date of Patent: Jun. 18, 2019

(54) SYSTEM, METHOD AND COMPUTER PROGRAM PRODUCT FOR SECURE PEER-TO-PEER TRANSACTIONS

(71) Applicants: Vivek Mundhra, San Jose, CA (US); Geeta Mundhra, San Jose, CA (US)

(72) Inventors: Vivek Mundhra, San Jose, CA (US); Geeta Mundhra, San Jose, CA (US)

(*) Notice: Subject to any disclaimer, the term of this patent is extended or adjusted under 35 U.S.C. 154(b) by 284 days.

(21) Appl. No.: 15/427,293

(22) Filed: Feb. 8, 2017

(65) Prior Publication Data

US 2017/0148023 A1 May 25, 2017

Related U.S. Application Data

(63) Continuation of application No. 14/710,585, filed on May 12, 2015, now Pat. No. 9,602,328.

(60) Provisional application No. 61/992,887, filed on May 14, 2014.

(51) Int. Cl.
*H04L 29/06* (2006.01)
*G06Q 20/40* (2012.01)
*H04L 29/08* (2006.01)
*G06Q 20/22* (2012.01)
*G06Q 20/38* (2012.01)

(52) U.S. Cl.
CPC ....... *G06Q 20/4012* (2013.01); *G06Q 20/223* (2013.01); *G06Q 20/3829* (2013.01); *H04L 29/06* (2013.01); *H04L 63/0492* (2013.01); *H04L 63/06* (2013.01); *H04L 63/061* (2013.01); *H04L 63/083* (2013.01); *H04L 63/0807* (2013.01); *H04L 63/0823* (2013.01); *H04L 67/1074* (2013.01); *H04L 67/104* (2013.01)

(58) Field of Classification Search
CPC ..... H04L 63/061; H04L 63/065; H04L 63/08; H04L 63/10
See application file for complete search history.

(56) References Cited

U.S. PATENT DOCUMENTS

| | | | |
|---|---|---|---|
| 5,692,132 A | 11/1997 | Hogan | |
| 6,678,664 B1 | 1/2004 | Ganesan | |
| 6,866,586 B2 | 3/2005 | Oberberger et al. | |
| 2005/0187873 A1 | 8/2005 | Labrou et al. | |
| 2006/0165060 A1* | 7/2006 | Dua | G06Q 20/20 370/352 |
| 2010/0197383 A1 | 8/2010 | Rader et al. | |

(Continued)

FOREIGN PATENT DOCUMENTS

WO  2014108916 A1  7/2014

*Primary Examiner* — Izunna Okeke
(74) *Attorney, Agent, or Firm* — Lincoln Law School of San Jose

(57) ABSTRACT

A system, method, and computer program product are provided for secure peer to peer transactions. In use, a peer to peer secured transaction is initiated between a first device and a second device. A request is prepared with signed keys at the first device, and the request may be received at the second device. Next, signed keys at the second device are validated and a response is prepared with signed keys at the second device and sent to the first device. Further, the response is cleared via issuer/broker/clearing house at the first device. Lastly, a receipt is prepared and signed at the first device, and the signed receipt is sent to the second device. Additional systems, methods, and computer program products are also presented.

17 Claims, 12 Drawing Sheets

(56) References Cited

U.S. PATENT DOCUMENTS

| | | |
|---|---|---|
| 2012/0259779 A1 | 10/2012 | Bharghavan et al. |
| 2014/0282869 A1* | 9/2014 | Dabbiere ................ H04L 63/10 726/3 |
| 2015/0142644 A1 | 5/2015 | Vaid et al. |
| 2015/0186887 A1 | 7/2015 | Khan et al. |
| 2015/0350177 A1* | 12/2015 | Sharp ..................... H04L 63/08 726/6 |

* cited by examiner

SYSTEM, METHOD AND COMPUTER PROGRAM PRODUCT FOR SECURE PEER-TO-PEER TRANSACTIONS

CROSS-REFERENCE TO RELATED APPLICATIONS

This application claims priority to U.S. patent application Ser. No. 14/710,585, entitled "SYSTEM, METHOD, AND COMPUTER PROGRAM PRODUCT FOR SECURE PEER-TO-PEER TRANSACTIONS," filed May 12, 2015, which claims priority to U.S. Provisional Patent Appl. No. 61/992,887, filed May 14, 2014, all of which are herein incorporated by reference.

BACKGROUND

The present invention relates to secure peer-to-peer transactions, and more particularly to systems and methods for securing peer-to-peer transactions with off-line transaction capabilities.

Traditional payment credit systems between a user and a merchant are generally limited to a merchant device validating one or more users' payment credentials to finalize a transaction. For example, such traditional payment credit systems may require a merchant to establish and use a payment approved device in order to conduct transactions. In contrast, non-merchant users cannot carry out similar transactions. As such, there is thus a need for addressing these and/or other issues associated with the prior art.

BRIEF SUMMARY

A system, method, and computer program product are provided for secure peer to peer transactions. In use, a peer to peer secured transaction is initiated between a first device and a second device. A request is prepared with signed keys at the first device, and the request may be received at the second device. Next, signed keys at the second device are validated and a response is prepared with signed keys at the second device and sent to the first device. Further, the response is cleared via issuer/broker/clearing house at the first device. Lastly, a receipt is prepared and signed at the first device, and the signed receipt is sent to the second device. Additional systems, methods, and computer program products are also presented.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description
Not Applicable.
Drawings

Figure 1:
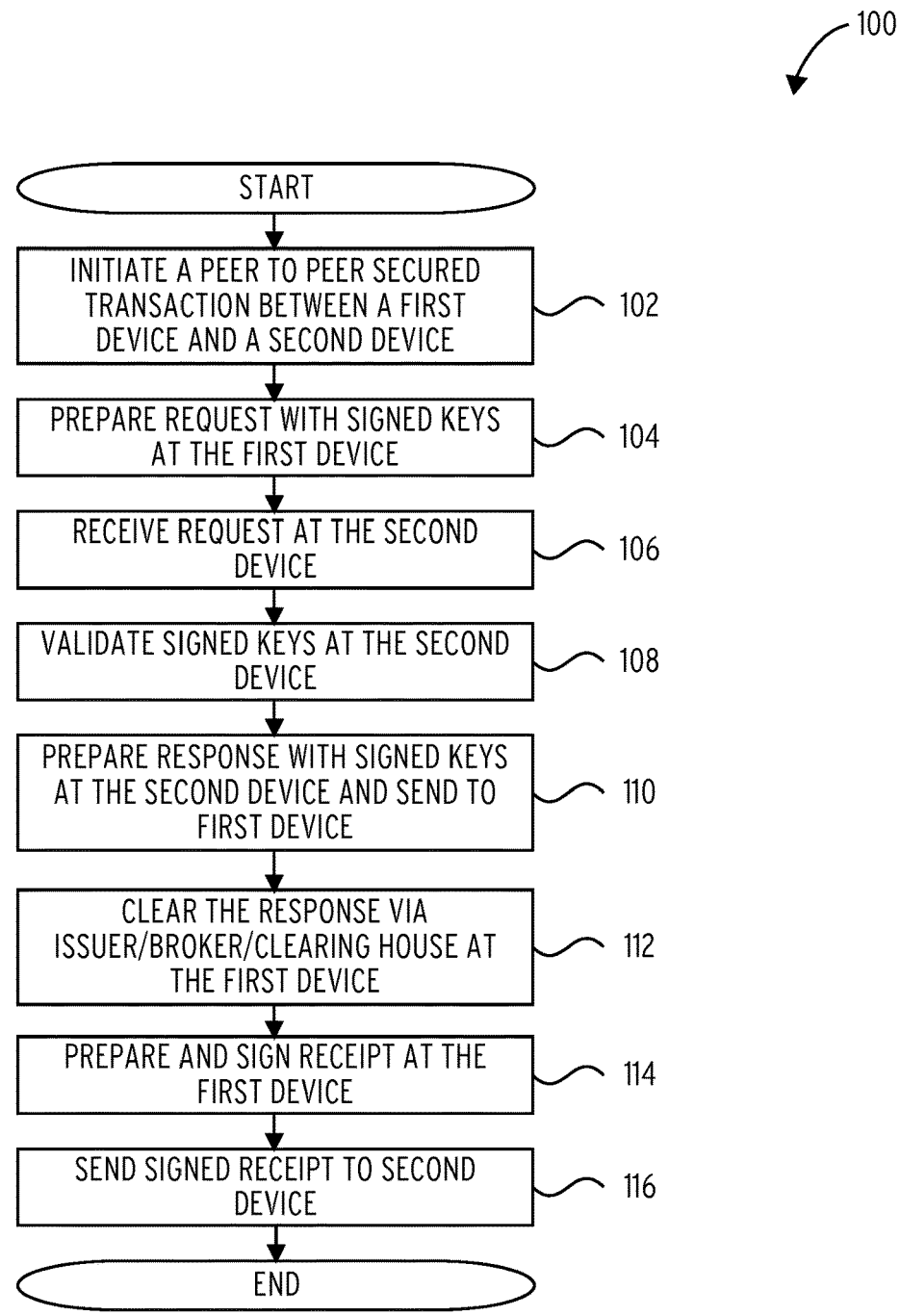
FIG. 1 illustrates an exemplary method for securing peer-to-peer transactions for off-line capabilities, in accordance with one embodiment.

FIG. 1 illustrates an exemplary method 100 for securing peer-to-peer transactions for off-line capabilities, in accordance with one embodiment. As an option, the method 100 may be carried out in the context of the details of any of the Figures disclosed herein. Of course, however, the method 100 may be carried out in any desired environment. Further, any aforementioned definitions may equally apply to the description below.

As shown, a peer to peer secured transaction is initiated between a first device and a second device. See item 102. In the context of the present description, a peer to peer transaction includes any transaction wherein a payment is transferred from a first user to a second user. In some embodiments, the transfer may occur wirelessly (e.g. wi-fi, NFC, bluetooh, etc.) between a plurality of devices (two or more). Additionally, the transfer may occur using a mobile device (e.g. smartphone, tablet, PDA, etc.), a portable computer (e.g. laptop, hybrid computer, etc.) and/or any other computing device.

In another embodiment, the transaction may be secured using any feasible encryption technology wherein the data that is sent to and from a first device and at least one other device cannot be read. In the context of the present description, encrypting includes any encoding process such that only authorized parties can read the data sent.

As shown, a first request is prepared with signed keys at the first device. See item 104. In various embodiments, the signed keys may be associated with more than one type of digital signature. For example, in one embodiment, a digital signature may include a private key (e.g. issued by a bank, etc.) which may be associated with a first user. Additionally, a public key may be associated with the first user such that when a request is prepared, it includes both a public key and a private key.

In one embodiment, an application may be used to prepare the information to create a digital signature, including, but not limited to, Unique Credential Identifier (BT, WIFI, NFC, Serial Number, ICCID, IMEI, and a Public Key. In various embodiment, the digital signature may be associated with a user, an application, a device, etc.

In another embodiment, once the digital signature has been prepared by an application, the application may send the digital signature to a bank for validation. The bank may review the digital signature and in response, sign the signature, which may include assigning a private key to the signature, and/or authorizing it by any other means.

In a further embodiment, signing and/or authorizing the digital signature may include creating hashes for the data, assigning a private key to the data, and/or attaching a public key associated with the bank. In one embodiment, the application may also create a hash out of the digital signature, and compare the hash calculated with the hash provided by the bank to determine if the data has been tampered with.

In one embodiment, user credentials may be associated with an application and/or a mobile device. For example, in one embodiment, the application may receive information associated with a user, and sign such information as an authenticated source/signature. The signed user credentials may then be stored on the mobile device and sent to a bank for authorization, wherein the bank may additionally receive and sign the user credentials. In such a manner, the bank may use the originally signed user credentials in the future to verify the authenticity of the user, including verifying when purchase transactions are associated with the user.

In another embodiment, the request may include preparing an invoice. Such an invoice may include one or more of a purchase amount, the name of the payer and/or payee, the location (e.g. address, GPS coordinates, etc.), the date, subject matter of the transaction, etc.

Still yet, in one embodiment, preparing the signed keys may include sending them for pre-authorization to an issuing authority (e.g. a bank, clearing house, etc.). The issuing authority may validate and additionally sign the signed keys. In this manner, the signed keys may be signed by not only by the application associated with the mobile device, but may also be signed by an issuing authority.

As shown, the request is received at the second device. See item 106. In various embodiments, the first device may connect to the second device using any technologically feasible method, including but not limited to a wi-fi connection (including wi-fi direct), bluetooth, near-field communication (NFC), and/or any other communication system whereby a first device by communicate with and connect to a second device.

In one embodiment, the first device may pair in some manner with a second device. In various embodiments, pairing (and/or connecting a first device to one or more other devices) may including a security hierarchy, wherein if a second or more device has been previously paired to the first device, the first device may more quickly allow the pairing to finalize. If a first device has not been previously connected/paired to a second or more device, then the two or more devices may be first paired (e.g. handshake permission request, etc.) so that the two or more devices can communicate. In a further embodiment, if a second device is associated with a user, where the user is connected in some manner (e.g. social media connection, etc.) to a user of the first device, a higher level of trust may be associated with the user associated with the second device.

As shown, the signed keys are validated at the second device. See item 108. In various embodiments, validating the signed keys may including decrypting the encrypted data, determining whether a hash value (calculated by the second device) matches a hash value contained in the encrypted data, and/or otherwise validating the integrity of the data originated from the first device.

In other embodiments, the signed keys may include a public key, private key, user credentials, application credentials, device credentials, geolocation credentials (e.g. permissible zones, etc.), etc.

In one embodiment, if the signed keys were previously validated by the issuing authority, then the second or more device may more easily accept the signed keys. However, if the signed keys were not previously validated by an issuing authority, then the second or more device may not accepted the signed keys, as they have not be validated by an external, trustworthy source. As such, in some embodiments, having the signed keys signed by an issuing authority may be a prerequisite to receiving and validating the signed keys at the second device.

As shown, a response is prepared with signed keys at the second device and sent to the first device. See item 110. In various embodiments, the signed keys may include generating a user signed key and an application signed key on the second device. Additionally, the response may include a verification of a payment amount (e.g. associated with the invoice, etc.). Of course, in other embodiments, other data may be included with the response, including a modification of the invoice (e.g. payment amount, a tip, etc.), a time designation (e.g. immediate transfer, etc.), a recipient destination (e.g. send payment to a location other than the first device, such as an email, etc.), etc.

In one embodiment, the response may include modifying at least one aspect of the signed keys sent from the first mobile device. For example, the sent signed keys may be validated, and a verification may be appended thereto (e.g. an additional key, etc.) to create modified signed keys.

As shown, once the response has been received, the response is cleared via the issuer/broker/clearing house at the first device. See item 112. In one embodiment, the response may be sent to the issuer/broker/clearing house (e.g. bank, etc.) to determine if the payment amount is allowed, and if the signed keys (by the first device and second device) are valid.

In one embodiment, the first device may first determine whether the response (e.g. including the check, etc.) has capabilities to be effective offline. If the response cannot be validated in an offline transaction, then the response may be denied by the first device. If the response can be validated offline, then the response may not need to be sent to an issuer/broker/clearing house, as the response may already have the capabilities embedded within to effectuate the transaction.

As shown, if the response is cleared by the issuer/broker/clearing house, or if the transfer can occur offline and has been accepted by the first device, then a receipt may be prepared and signed at the first device. See item 114. Further, the signed receipt is sent to the second device. See item 116.

Of course, in other embodiments, the receipt may include any number of additional information and/or data, including time of the transfer, the basis for the approval (e.g. signed key by device A, signed key by device B, etc.), the location of the transaction, a guarantee (e.g. backed by an issuing authority, etc.), etc.

In some embodiments, a method may include receiving, at an application stored on a first mobile device, a first set of user data, submitting the first set of user data to a server, generating a public-private key pair for the application and the user. Additionally, application credentials and user credentials may be prepared, authenticated, and stored. Further, the method may include sending a copy of the application credentials and the user credentials to an issuing authority, receiving the copy of the application credentials and the user credentials authenticated by the issuing authority, and/or storing the copy of the application credentials and the user credentials signed by issuing authority on the first mobile device.

In some embodiments, the first set of user data may include one or more of: a user identification, a password, at least a portion of a social security number associated with the user, at least a portion of an account number associated with an issuing authority, and an activation code.

In some embodiments, the application credentials may include at least one of: a unique identifier associated with the application credentials, the public key generated for the application, a version of the application, and a hardware address for a network connection.

In some embodiments, the user credentials may include at least one of: a first name of the user, a last name of the user, the public key generated for the user, a unique personal identification number (PIN) assigned to the to the user by an issuing authority, and a photograph of the user.

In some embodiments, such a method may further include receiving, at the application stored on the first mobile device, information associated with a financial transaction, including but not limited to an invoice number, a transaction number, an invoice amount, a payment amount, identification information associated with the payer or payee, etc.

In some embodiments, the information associated with the financial transaction may include at least one of: an amount associated with a good or a service, a description associated with the good or the service, and a code associated with the good or the service. In one embodiment, the information associated with the financial transaction may include receiving a code (e.g. coupon, etc.) to be applied to the transaction. Additionally, in one embodiment, if the payer is a repeat customer, the first device may track the number of times the payer has paid (e.g. over the past 6 months, etc.), and based on the payment history, offer one or more discounts (e.g. 10% off based on payer spending $X over the past 6 months, payer referred a new user to payee and therefore gets a reward, etc.)

In some embodiments, such a method may further include connecting, using a wireless connection, the first mobile device to a second mobile device, validating at least one of a hardware address and a certificate associated with the second mobile device, sending, using the public key associated therewith, the user credentials and application credentials associated with the first mobile device to the application of the second mobile device, receiving user credentials and application credentials associated with the second application of the second mobile device, validating the user credentials and application credentials associated with the second application of the second mobile device, and/or displaying, using the first application of the first mobile device, the user credentials associated with the second application of the second mobile device.

In some embodiments, the second application may be associated with user data of a second user. Additionally, in some embodiments, the user credentials and the application credentials are associated with an invoice.

Still yet, in some embodiments, such a method may further include sending the user credentials and application credentials associated with the first mobile device to a second mobile device, and in response to the sending, receiving a payment amount based on the invoice. Further, the method may include verifying whether the payment amount is approved of by a second issuing authority associated with the second mobile device.

In some embodiments, if the payment amount is approved, a receipt may be prepared by the first mobile device and sent to the second mobile device, and if the payment is not approved, then the payment amount may not be finalized.

In some embodiments, the invoice is sent to a second mobile device, and in response, a payment associated with the second mobile device may be received at the first mobile device.

In some embodiments, the payment may include at least one of a user signed key and an application signed key. In other embodiments, the payment may include a user signed key and an application signed key.

In some embodiments, the transaction process may include validating the user signed key and the application signed key, determining whether the first mobile device is offline, where if the first mobile device is offline, it is then determined whether the payment allows for an offline transaction, where if the payment allows for offline transaction, accepting the payment, and/or where if the payment does not allow for offline transaction, not accepting the payment.

In some embodiments, the payment may further include a check identifier. In some embodiments, the second mobile device may validate the user signed key and application key and may further verify a hardware address (e.g. device identification, IMEI code, network address, etc.).

In some embodiments, the user signed key and application signed key are encrypted. Additionally, in some embodiments, the user credentials and the application credentials are encrypted.

In some embodiments, the encrypted user credentials and the encrypted application credentials may be sent to a second mobile device. In one embodiment, the second mobile device may decrypt and validate the user credentials and the application credentials.

In some embodiments, a mobile application may be used on the second mobile device to validate the user credentials and the application credentials, as well as to create the user signed key and the application signed key.

In some embodiments, the mobile application receives a manually inputted signature on the second device. For example, in one embodiment, after receiving the invoice from the first mobile device at the second device, a user at the second device may authorize a payment amount and sign the payment including writing a signature on the display of the second device, and/or otherwise signing (e.g. digital signature, etc.) the payment amount. In some embodiments, the signature may be displayed with the payment.

In some embodiments, a transaction occurs between the first mobile device and at least one other mobile device. For example, in one embodiment, a first mobile device may be a merchant and the at least one other mobile device may be a customer. In a specific example, multiple customers (all associated in some manner) may wish to purchase a product from the merchant. Using the secure transaction system, the merchant may send an invoice to each of the customers who desire to assist in paying for the product. In one embodiment, the merchant may indicate an equal allocation of payment among all the customers involved. In another embodiment, the merchant may indicate the total price on each of the customers may agree among themselves how much each will pay. In one embodiment, the devices of the customers may communicate with one another such that when one customer indicates an amount that will be paid, the dividend to be displayed is shown on the screen of the devices participating in the transaction. In this manner, multiple devices may be involved in the secure transaction.

In some embodiments, the first mobile device and at least one other mobile device connect via at least one of WiFi, bluetooth, and NFC. Of course, in other embodiments, the first mobile device and at least one other mobile device may connect via a wired connection (e.g. peripheral port, ethernet, etc.) and/or be otherwise connected.

Figure 2:
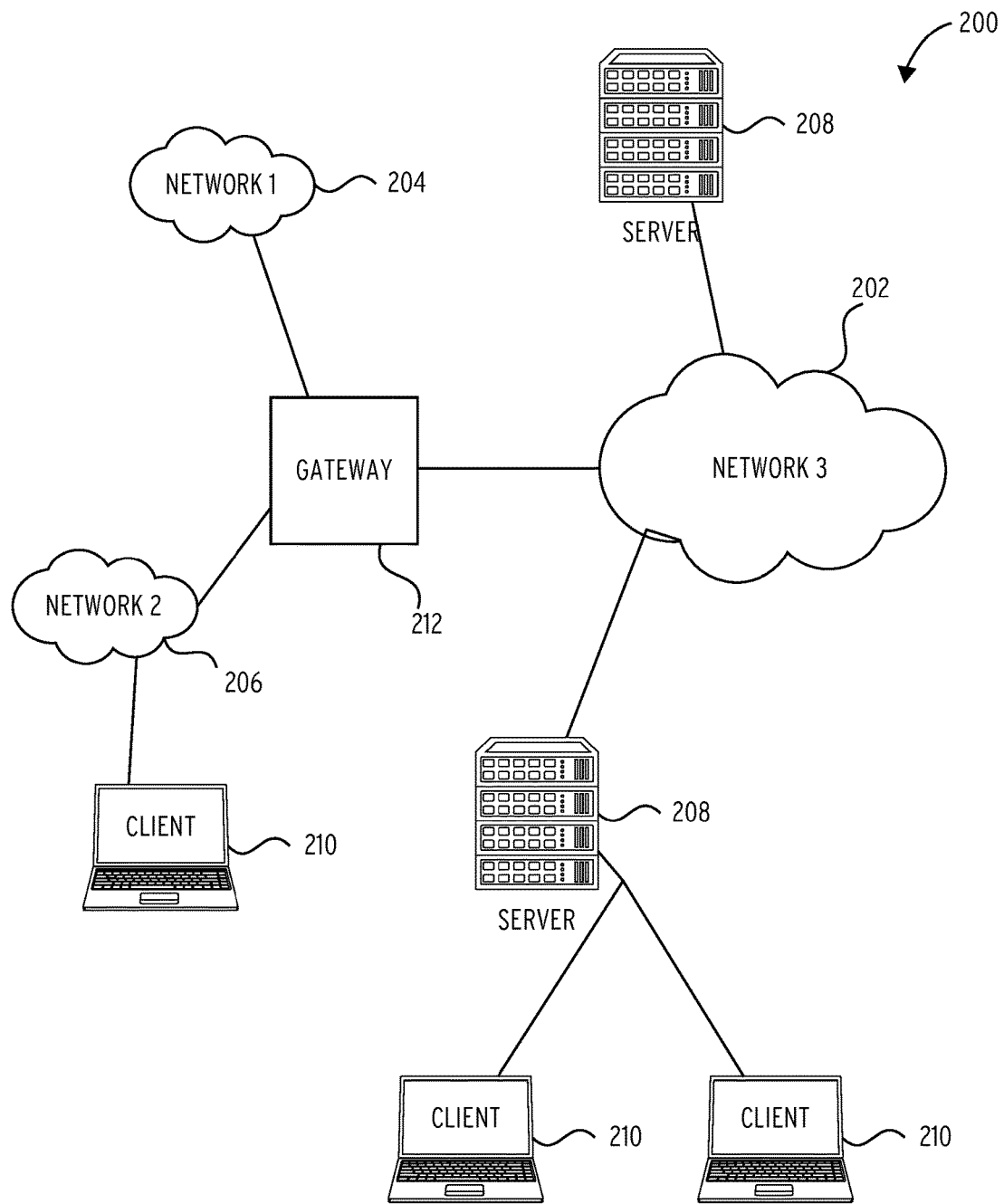
FIG. 2 illustrates a network architecture, in accordance with one embodiment.

FIG. 2 illustrates a network architecture 200, in accordance with one embodiment. As shown, a plurality of networks, Network 1 204, Network 2 206, and Network 3 202, are provided. In the context of the present network architecture, the networks, Network 1 204, Network 2 206, and Network 3 202 may each take any form including, but not limited to a local area network (LAN), a wireless network, a wide area network (WAN) such as the Internet, peer-to-peer network, etc. Additionally, such networks may include a RFID communication between Client 210 and another device (e.g. wearable, cloud, tag, etc.). Further, such networks may include any peer to peer (P2P) or device to device communication.

Coupled to the Network 3 202 are one or more Server 208 which are capable of communicating over the Network 3 202, as well as any other applicable network (e.g. Network 1 204, Network 2 206, etc.). Also coupled to Network 2 206 and Network 3 202 (or any other applicable network) and the Server 208 is a plurality of Client 210. Such Server 208 and/or Client 210 may each include a desktop computer, lap-top computer, hand-held computer, mobile phone, portable device, personal digital assistant (PDA), peripheral (e.g. printer, etc.), any component of a computer, and/or any other type of logic. In order to facilitate communication among Network 1 204, Network 2 206, Network 3 202, and/or any other network, at least one Gateway 212 is optionally coupled therebetween. In the context of the present description, cloud refers to one or more servers, services, and/or resources which are located remotely.

Figure 3:
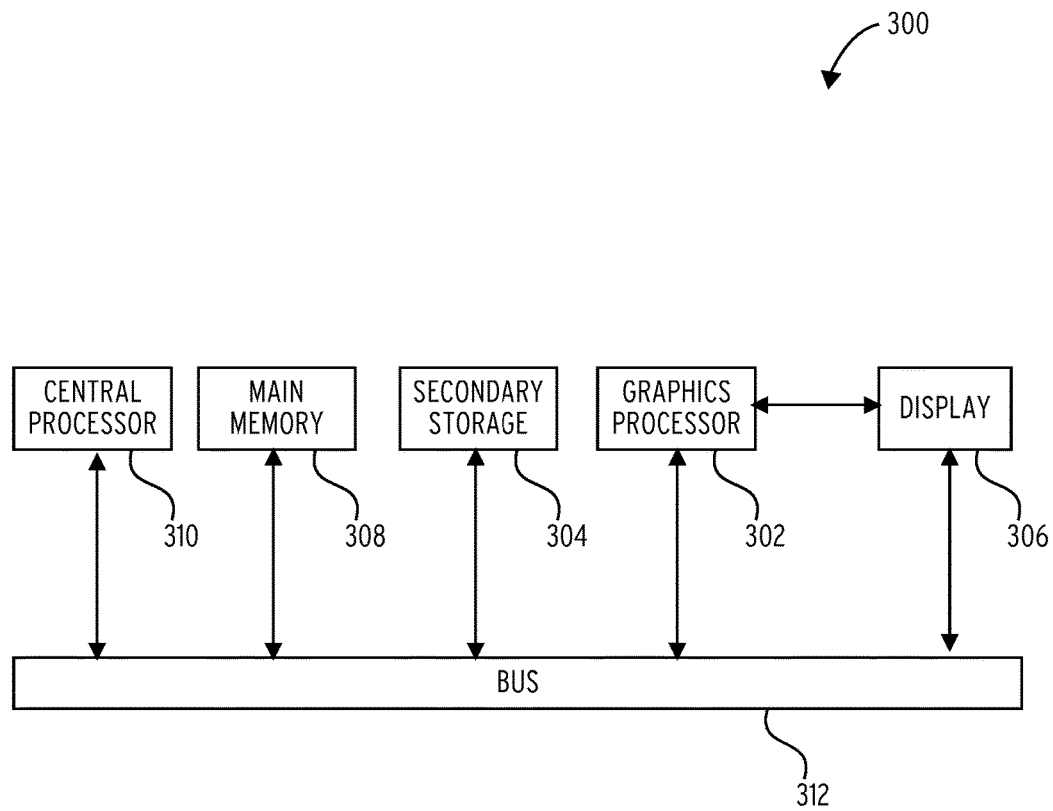
FIG. 3 illustrates an exemplary system in which the various architecture and/or functionality of the previous embodiment and/or subsequent embodiments may be implemented.

FIG. 3 illustrates an exemplary system 300 in which the various architecture and/or functionality of the previous embodiment and/or subsequent embodiments may be implemented. As shown, a system 300 is provided including at least one host Central Processor 310 which is connected to a Communication Bus 312. The system also includes a Main Memory 308. Control logic (software) and data are stored in the Main Memory 308 which may take the form of random access memory (RAM).

The system also includes a Graphics Processor 302 and a Display 306, i.e. a computer monitor. In one embodiment, the Graphics Processor 302 may include a plurality of shader modules, a rasterization module, etc. Each of the foregoing modules may even be situated on a single semiconductor platform to form a graphics processing unit (GPU).

The system may also include a Secondary Storage 304. The Secondary Storage 304 includes, for example, at least one of a non-volatile memory (e.g. flash memory, magnetoresistive memory, ferroelectric memory, etc.), a hard disk drive, and a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the Main Memory 308 and/or the Secondary Storage 304. Such computer programs, when executed, enable the system to perform various functions. The Main Memory 308, the Secondary Storage 304 and/or any other storage are possible examples of computer-readable media.

In one embodiment, the architecture and/or functionality of the various previous figures may be implemented in the context of the host Central Processor 310, Graphics Processor 302, an integrated circuit (not shown) that is capable of at least a portion of the capabilities of both the host Central Processor 310 and the Graphics Processor 302, a chipset (i.e. a group of integrated circuits designed to work and sold as a unit for performing related functions, etc.), and/or any other integrated circuit for that matter.

Additionally, the architecture and/or functionality of the various previous figures may be implemented in the context of a general computer system, a circuit board system, a game console system dedicated for entertainment purposes, an application-specific system, and/or any other desired system. For example, the system may take the form of a desktop computer, a laptop computer, a server computer, and/or any other type of logic. Still yet, the system may take the form of various other devices including, but not limited to, a personal digital assistant (PDA) device, a mobile device, a tablet device, a television, etc. In the context of the present description, a mobile device may include any portable computing device, including but not limited to, a laptop computer, a tablet computer, a desktop computer, a mobile phone, a media player, a camera, a television, and/or any other portable computing device.

Further, while not shown, the system may be coupled to a network (e.g. a telecommunications network, local area network (LAN), wireless network, wide area network (WAN) such as the Internet, peer-to-peer network, cable network, etc.) for communication purposes. As an example, any of the Network 1 204, Network 2 206, and/or Network 3 202 may be used for such coupling.

Of course, the various embodiments set forth herein may be implemented utilizing hardware, software, or any desired combination thereof. For that matter, any type of logic may be utilized which is capable of implementing the various functionality set forth herein.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
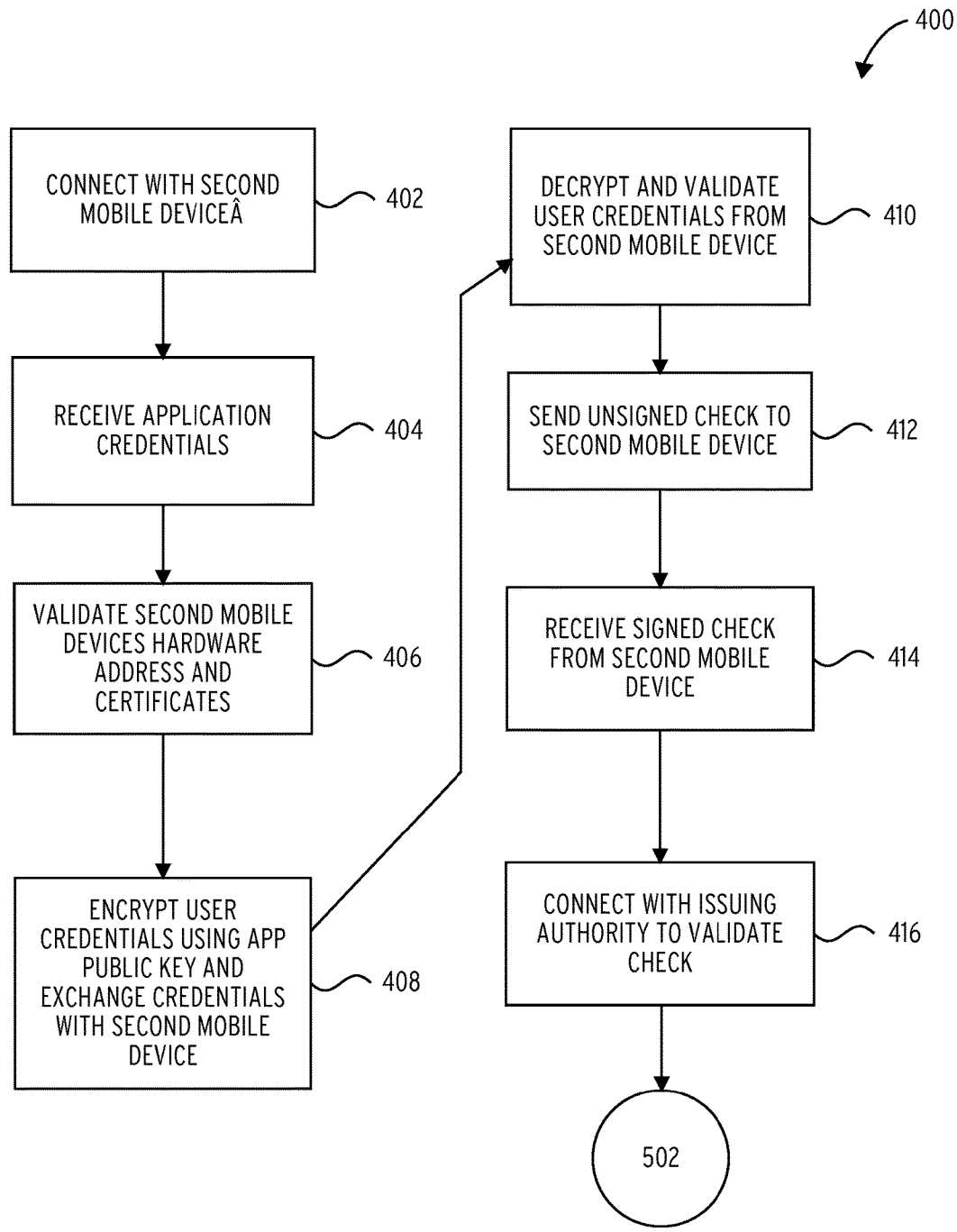
FIG. 4 is an exemplary method for conducting a peer to peer transaction, in accordance with one embodiment.

FIG. 4 is an exemplary method 400 for conducting a peer to peer transaction, in accordance with one embodiment. As an option, the method 400 may be carried out in the context of the details of any of the Figures disclosed herein. Of course, however, the method 400 may be used in any desired environment. Further, any aforementioned definitions may equally apply to the description below.

As shown, a first mobile device is connected to a second mobile device. See item 402. Next, application credentials are received. See item 404.

In various embodiments, application credentials may be associated with the first mobile device and/or with the second mobile device. For example, in one embodiment, application credentials associated with the first mobile device may be received as part of the application sign-on process (e.g. verify that the application credentials are received/present and valid, etc.). In another embodiment, the application credentials may be received from the second mobile device to determine if the second mobile device is valid and safe to connect to for purposes of engaging in a transaction.

As shown, the hardware address and certificates associated with the second mobile device are validated. See item 406. In one embodiment, the hardware address may include a wireless connection address (e.g. IP address, etc.), a device identification (e.g. IMEI, etc.), a device signature (e.g. encrypted credentials of the device, etc.), etc. Additionally, as discussed hereinabove, the certificates may include a digital certificate associated with the user, the device, and/or the application.

Next, the user credentials are encrypted using the application public key and the credentials are exchanged with the second mobile device. See item 408. In one embodiment, the public key included with the exchange may issue originally from an issuing authority (e.g. bank, etc.) such that the credentials have been previously certified by an external source.

As shown, the user credentials are decrypted and validated from the second mobile device. See item 410. In one embodiment, the first device may receive the user credentials from the second mobile device after the second mobile device has received the first mobile device user credentials, decrypted the first mobile device user credentials, and appended to the first mobile device user credentials a signature associated with the second user of the second mobile device. In another embodiment, the second mobile device user credentials may be sent separate from the first mobile device user credentials (i.e. the second mobile device user credentials are not appended to the first mobile device user credentials).

In response to decrypting and validating the user credentials from the second mobile device, an unsigned check may be sent to the second mobile device. See item 412. In one embodiment, the unsigned check may be associated with an invoice. In one embodiment, the unsigned check may be the invoice.

As shown, a signed check is received from the second mobile device. See item 414. In one embodiment, the signed check may be signed by hand (e.g. inputted via the screen of a device, etc.), and/or a digital signature may be associated with the signed check in some manner.

In response, a check is validated by connecting with an issuing authority. See item 416. For example, in one embodiment, the signed check may be sent to a bank to determine the signed check is genuine, authentic, and that there are sufficient funds in the account.

As shown, item 416 leads to item 502.

Figure 5:
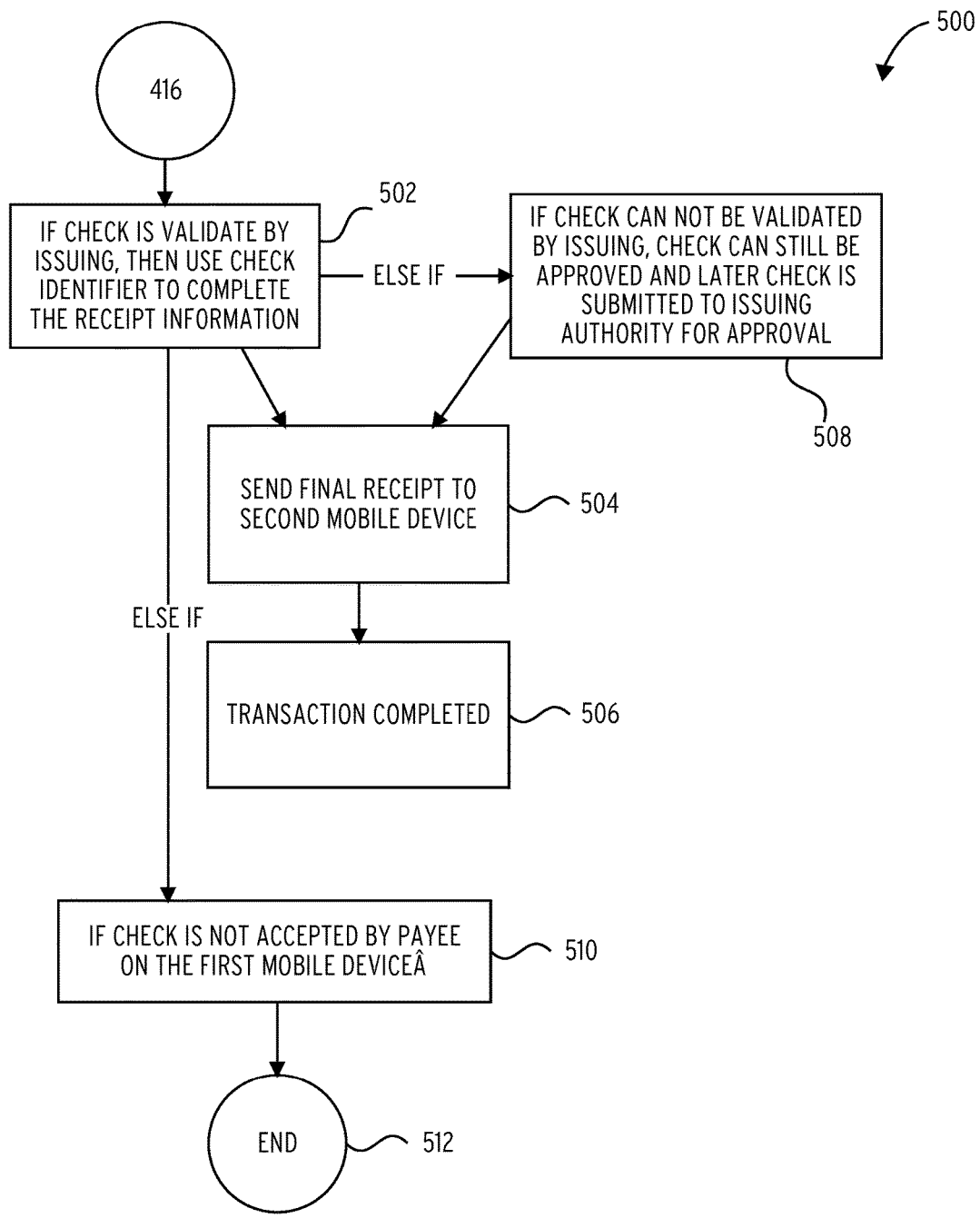
FIG. 5 is an exemplary method for conducting a peer to peer transaction, in accordance with one embodiment.

FIG. 5 is an exemplary method 500 for conducting a peer to peer transaction, in accordance with one embodiment. As an option, the method 500 may be carried out in the context of the details of any of the Figures disclosed herein. Of course, however, the method 500 may be used in any desired environment. Further, any aforementioned definitions may equally apply to the description below.

As shown, item 502 begins where item 416 left off. As shown, if check is validated by the issuing authority, then the check identifier is used to complete the receipt information. See item 502. Of course, any identifier (e.g. transaction, check, user id, etc.) may be used to indicate acceptance of the check.

Additionally, the final receipt may be sent to the second mobile device. See item 504. Additionally the transaction may be completed. See item 506.

In the event a check cannot be validated using the issuing authority, there are two alternatives. The first alternative is that a check can still be approved and later the check may be submitted to issuing authority for approval. See item 508. If such a route is pursued, then item 508 proceeds to items 504 and item 506.

The second alternative is if the check is not accepted by the payee on the first mobile device. See item 510. If an issuing authority cannot validate the signed check, the payee can decide whether or not to accept the check. In this embodiment, the payee decides not to accept the signed check, whereby the process ends. See item 512.

Figure 6:
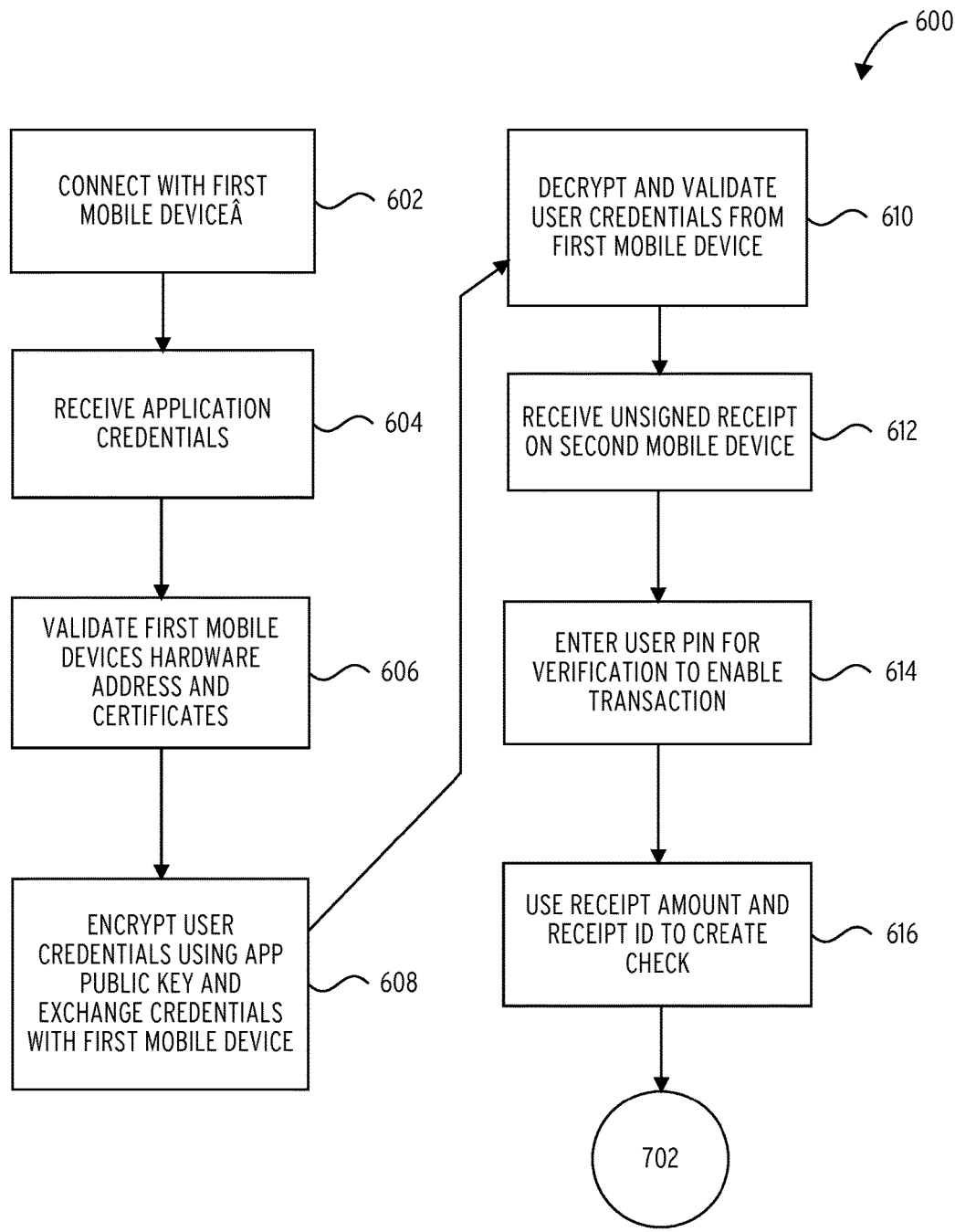
FIG. 6 is an exemplary method for conducting a peer to peer transaction, in accordance with one embodiment.

FIG. 6 is an exemplary method 600 for conducting a peer to peer transaction, in accordance with one embodiment. As an option, the method 600 may be carried out in the context of the details of any of the Figures disclosed herein. Of course, however, the method 600 may be used in any desired environment. Further, any aforementioned definitions may equally apply to the description below.

As shown, a second mobile device connects with a first mobile device. See item 602. Of course, it should be noted that in other embodiments, any number of devices may connect to the first mobile device to participate in the transactions. For purposes of this embodiment, however, only one second mobile device will be described however.

Next, application credentials are received. See item 604.

In various embodiments, application credentials may be associated with the first mobile device and/or with the second mobile device. For example, in one embodiment, application credentials associated with the second mobile device may be received as part of the application sign-on process (e.g. verify that the application credentials are received/present and valid, etc.). In another embodiment, the application credentials may be received from the first mobile device to determine if the first mobile device is valid and safe to connect to for purposes of engaging in a transaction.

As shown, the hardware address and certificates associated with the first mobile device are validated. See item 606. In one embodiment, the hardware address may include a wireless connection address (e.g. IP address, etc.), a device identification (e.g. IMEI, etc.), a device signature (e.g. encrypted credentials of the device, etc.), etc. Additionally, as discussed hereinabove, the certificates may include a digital certificate associated with the user, the device, and/or the application.

Next, the user credentials are encrypted using the application public key and the credentials are exchanged with the first mobile device. See item 608. In one embodiment, the public key included with the exchange may issue originally from an issuing authority (e.g. bank, etc.) such that the credentials have been previously certified by an external source.

As shown, the user credentials are decrypted and validated from the first mobile device. See item 610. In one embodiment, the second mobile device may receive the user credentials from the first mobile device after the first mobile device has received the second mobile device user credentials, decrypted the second mobile device user credentials, and appended to the second mobile device user credentials a signature associated with the first user of the first mobile device. In another embodiment, the first mobile device user credentials may be sent separate from the second mobile device user credentials (i.e. the first mobile device user credentials are not appended to the second mobile device user credentials).

In response to decrypting and validating the user credentials from the first mobile device, an unsigned check may be received to the second mobile device. See item 612. In one embodiment, the unsigned check may be associated with an invoice. In one embodiment, the unsigned check may be the invoice.

As shown, a user pin may be entered for verification to enable the transaction. See item 614. In various embodiments, any security step may be employed give verification to use the application for the transaction. For example, a thumbprint scanner, retina scanner, pin code, pin pattern, two part verification (e.g. enter password and a server text messages a temporary code, etc.), etc. may be used to verify that the application may proceed forward with the transaction.

Additionally, the receipt amount and the receipt id are used to create a check. See item 616. Of course, in various embodiments, a unsigned receipt may be sent to the user of the first device. In other embodiments, an invoice amount, and/or any predesignated amount may be presented and/or transferred to the second mobile device in some manner.

As shown, item 616 leads to item 702.

Figure 7:
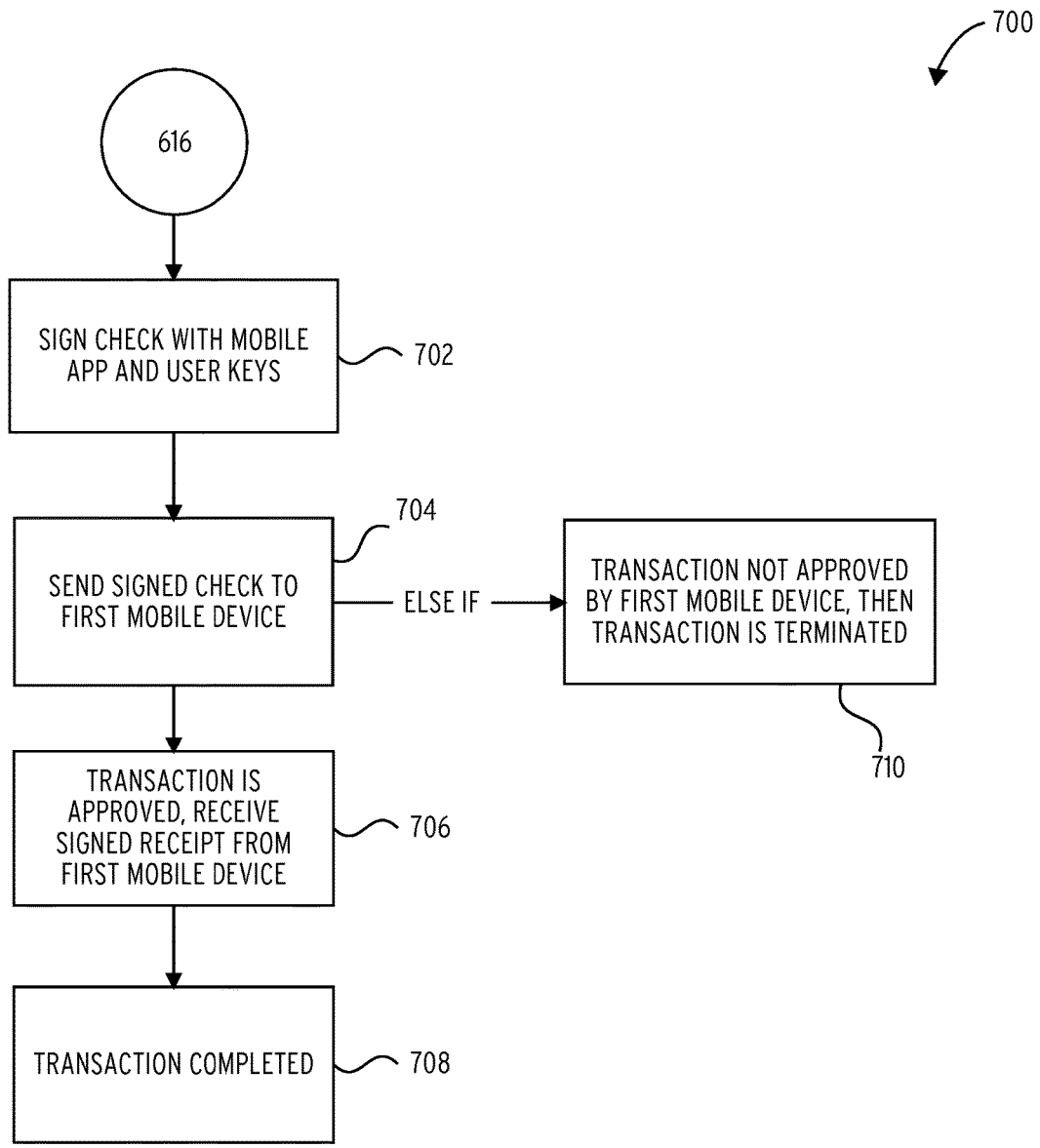
FIG. 7 is an exemplary method for conducting a peer to peer transaction, in accordance with one embodiment.

FIG. 7 is an exemplary method 700 for conducting a peer to peer transaction, in accordance with one embodiment. As an option, the method 700 may be carried out in the context of the details of any of the Figures disclosed herein. Of course, however, the method 700 may be used in any desired environment. Further, any aforementioned definitions may equally apply to the description below.

As shown, item 702 begins where item 616 left off. As shown, a check may be signed with the mobile app and user keys on the second mobile device. See item 702.

In various embodiments, the signing of the check may include associating the check with one or more digital signatures, including a signature associated with the user, the device, and/or the application. Additionally, in one embodiment, a public key issued from an issuing authority (e.g. the bank, etc.) may be appended to the signed check as well.

As shown, the signed check is sent to the first mobile device. See item 704. Next, if the transaction is approved, the signed receipt is received from the first mobile device. See item 706. In various embodiments, the transaction may be approved directly by the issuing authority who sanctions the transactions, or in the event the issuing authority cannot be contacted, the payee may still nonetheless approve the transaction, causing the second mobile device to receive the signed receipt. Next, the transaction is completed. See item 708.

In the alternative, if the transaction is not approved of in response to item 704 by the first mobile device, the transaction may then be terminated.

Figure 8:
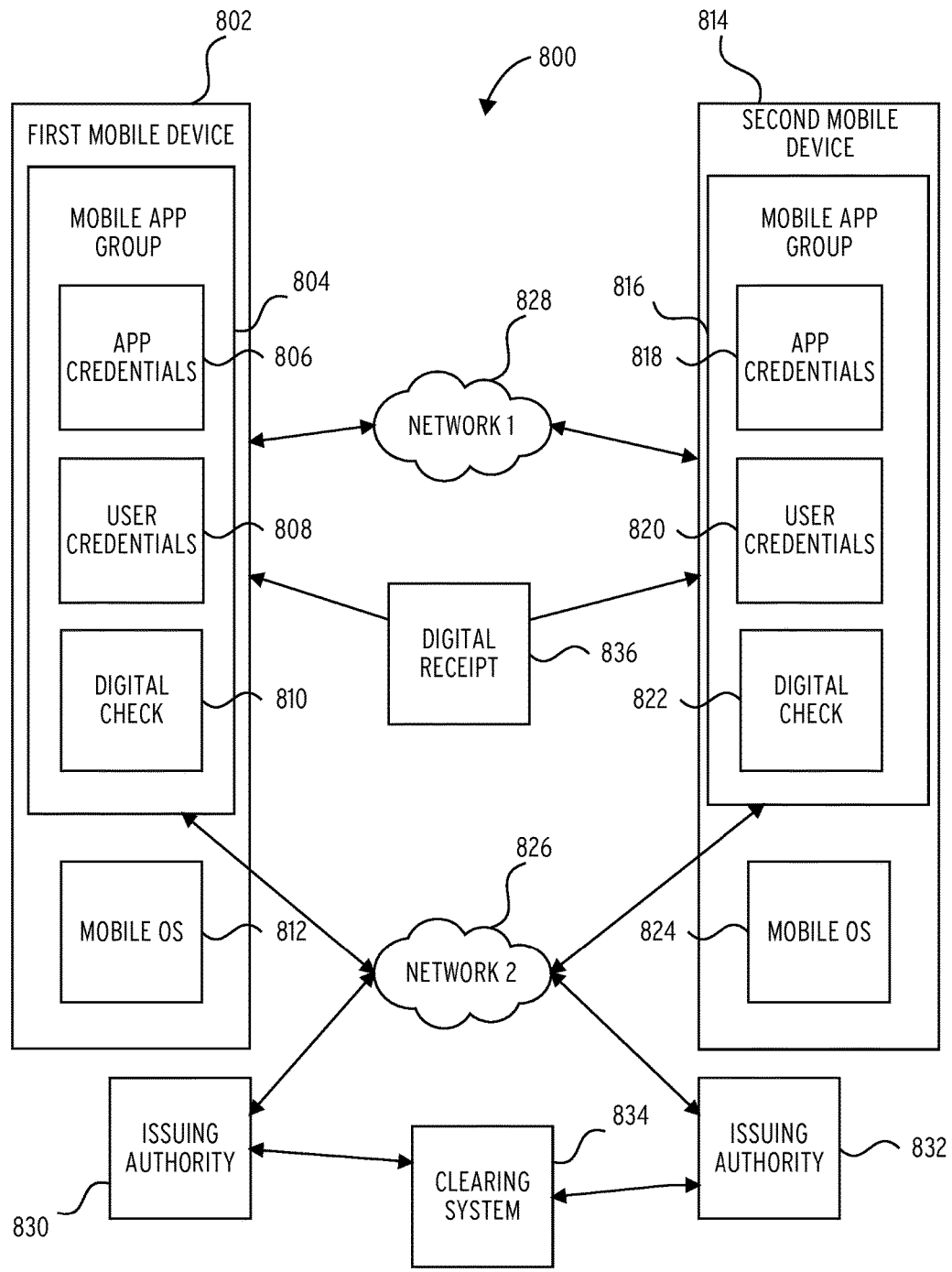
FIG. 8 is an exemplary system for conducting a peer to peer transaction, in accordance with one embodiment.

FIG. 8 is an exemplary system 800 for conducting a peer to peer transaction, in accordance with one embodiment. As an option, the system 800 may be carried out in the context of the details of any of the Figures disclosed herein. Of course, however, the system 800 may be used in any desired environment. Further, any aforementioned definitions may equally apply to the description below.

As shown, a first mobile device item 802 may include a mobile operating system item 812 and a mobile app group item 804. In one embodiment, the mobile app group item 804 may include one or more security items, such as app credentials item 806, user credentials item 808, and digital check item 810. Of course, in other embodiments, the mobile app group item 804 may be provisioned and/or encrypted within the memory structure of the first mobile device item 802 to increase security.

Additionally, as shown, a second mobile device item 814 may include a mobile operating system item 824 and a mobile app group item 816. In one embodiment, the mobile app group item 816 may include one or more security items, such as app credentials item 818, user credentials item 820, and digital check item 822. Of course, in other embodiments, the mobile app group item 816 may be provisioned and/or encrypted within the memory structure of the second mobile device item 814 to increase security.

As shown the first mobile device item 802 is connected to a first network item 828. Additionally, the second mobile device item 814 is also connected to the first network item 828. In various embodiments, the first network may include a WiFi, NFC, or bluetooth connection, and/or any other wireless connection.

Additionally, the mobile app group item 804 associated with the first mobile device item 802 is connected to a second network item 826. Further, the mobile app group item 816 associated with the second mobile device item 814 is connected to the second network item 826. In various embodiments, the second network item 826 may include any data connection (e.g. to the cloud, to an extranet, to an internet, etc.).

As shown, an issuing authority item 830 may be associated via the second network item 826 to the first mobile device item 802. In like manner, an issuing authority item 832 may be associated via the second network item 826 to the second mobile device item 814. In one embodiment, the issuing authority may include a system responsible for application and user registration, validation, check issuance, redemption and/or clearing of checks. In one embodiment, an issuing authority may include a bank, clearing house, etc.

Lastly, clearing house item 834 may be associated in some manner to the issue authority item 830 and/or issuing authority item 832. In one embodiment, the clearing system may include a system which exchanges checks and cash between various issuing systems. In some embodiments, both the issuing authority and the clearing system may be implemented as software running on hardware associated with the first mobile device item 802 and/or the second mobile device item 814.

In one embodiment, a mobile operating system may include any operating system capable of running on a mobile device, including but not limited to Android, iOS, Windows Mobile, Linux, etc.

In one embodiment, the mobile app group item 804 and/or item 816 may include a system responsible for implementing the procedures for setup, registration, transaction and/or processing on behalf of the user. In another embodiment, the mobile app group item 804 and/or item 816 may also implement a process to communicate, validate and fetch and submit Digital Checks item 810 and/or item 822 from the Issuing Authority item 830 and/or item 832.

In one embodiment, the app credentials item 806 and/or item 818 may include any information about the mobile app group item 804 and/or item 816, including unique app credentials identifier, app public key, application version, build, platform, hardware address (e.g. for network connectivity, etc.), etc. Additionally, the app credentials and/or item 818 may be signed by the Issuing Authority item 830 and/or item 832.

In another embodiment, user credentials item 808 and/or item 820 may include information about the User, including but not limited to a user public key, First and Last name, an assigned unique ID, app credentials ID and optional user photo. Additionally, user credentials item 808 and/or item 820 may be signed by the Issuing Authority item 830 and/or item 832 and/or the the Mobile App Group item 804 and/or item 816.

In one embodiment, the digital check item 810 and/or item 822 may be created and signed by the Issuing Authority item 830 and/or item 832 and set a Max Amount, Max Offline Amount, Geo Limits, Time to Live, Unique Identifier, an identifier associated with User Credentials item 808 and/or item 820, and an identifier associated with Application Credentials item 806 and/or item 818.

Further, as shown, a digital receipt item 836 may be associated with the first mobile device item 802 and/or the second mobile device item 814. In one embodiment, the digital receipt item 836 may be generated as part of the transaction. For example, the payee may send this to the payer. Additionally, the receipt may include a unique receipt number, check number, transaction details (such as date and time, amount, list of goods and/or services and location), and credentials of payee, payee application credentials. Additionally, in one embodiment, this information may be signed with the payee application and payee app credentials item 818 or item 806 (depending on which device is functioning as the payee).

Figure 9:
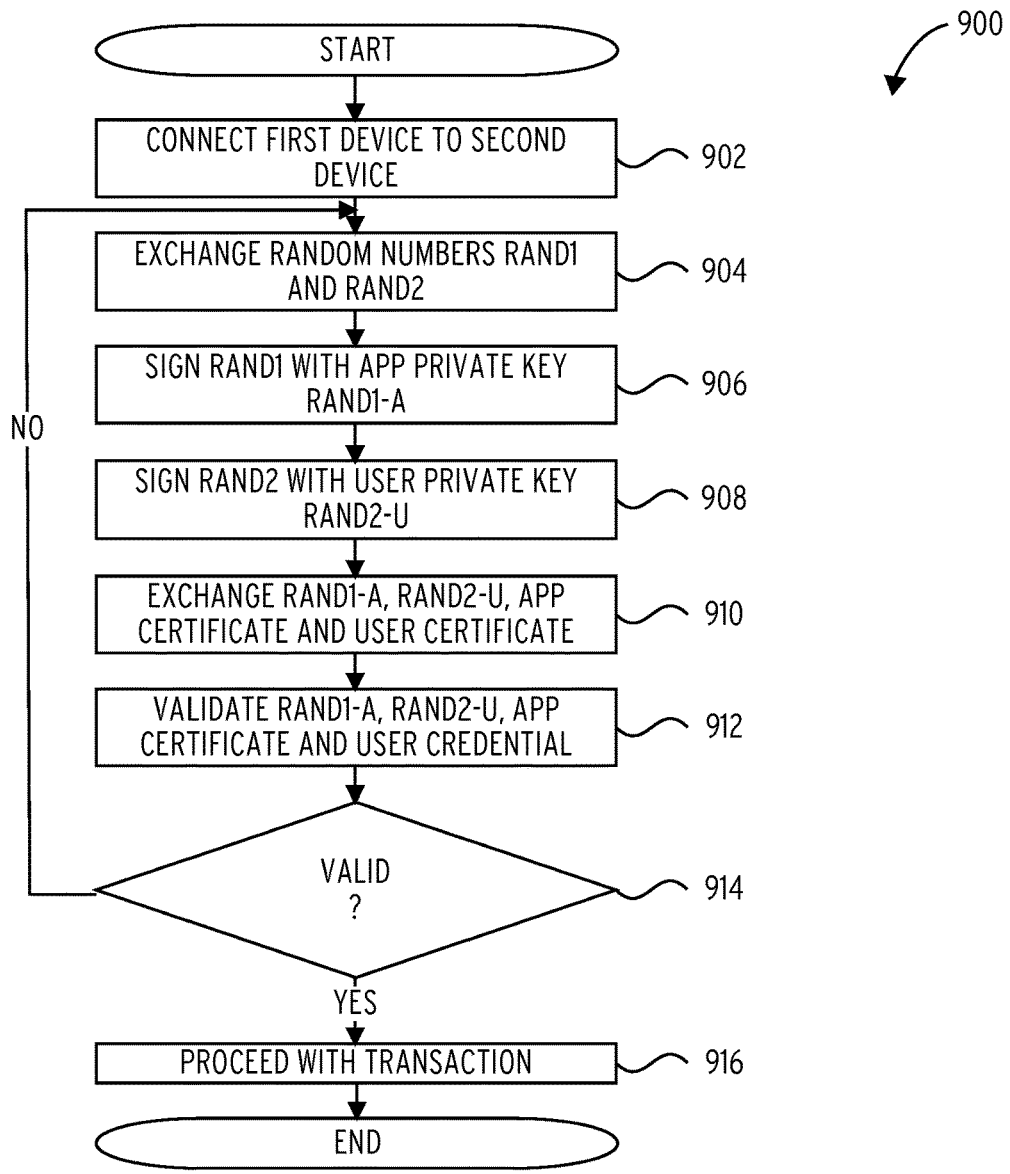
FIG. 9 is an exemplary method for connecting and validating a peer before proceeding with a peer to peer transaction, in accordance with one embodiment.

FIG. 9 is an exemplary method 900 for connecting and validating a peer before proceeding with a peer to peer transaction, in accordance with one embodiment. As an option, the method 900 may be carried out in the context of the details of any of the Figures disclosed herein. Of course, however, the method 900 may be used in any desired environment. Further, any aforementioned definitions may equally apply to the description below.

As shown, a first device is connected to a second device. See item 902. Additionally, the random numbers RAND1 and RAND2 are exchanged. See item 904. In one embodiment, the first device may send such random numbers to the second device. Of course, however, the initiation of the exchange may be dependent on whether the device is functioning as a "payer" or as a "payee." If the device was operating as a "payee," then it may prepare the invoice and send the random numbers to determine if a transaction can occur with the second device.

Additionally, as shown, RAND1 is signed with app private key RAND1-A. See item 906. Additionally, RAND2 is signed with user private key RAND2-U. See Item 908. Further, RAND1-A, RAND2-U, app certificate and user certificate are exchanged. See Item 910. In one embodiment, the signing of the app private key and user private key and the exchange may include sending from the second device to the first device (e.g. from the payer device(s) to the payee device).

As shown, RAND1-A, RAND2-U, app certificate, and user credential are validated. See Item 912. In one embodiment, the validation may occur on the first device (e.g. payee device, etc.).

Next, it is determined whether the validation is valid. See decision 914. If it is determined that the validation failed, random numbers RAND1 and RAND2 may be reexchanged. See item 904. In another embodiment, if the validation failed, the transaction may simply end without success (not shown).

If the validation is valid, then the transaction may proceed. See Item 916. In one embodiment, allowing the transaction to proceed forward may include at least one of item 1010 or item 1034.

Figure 10:
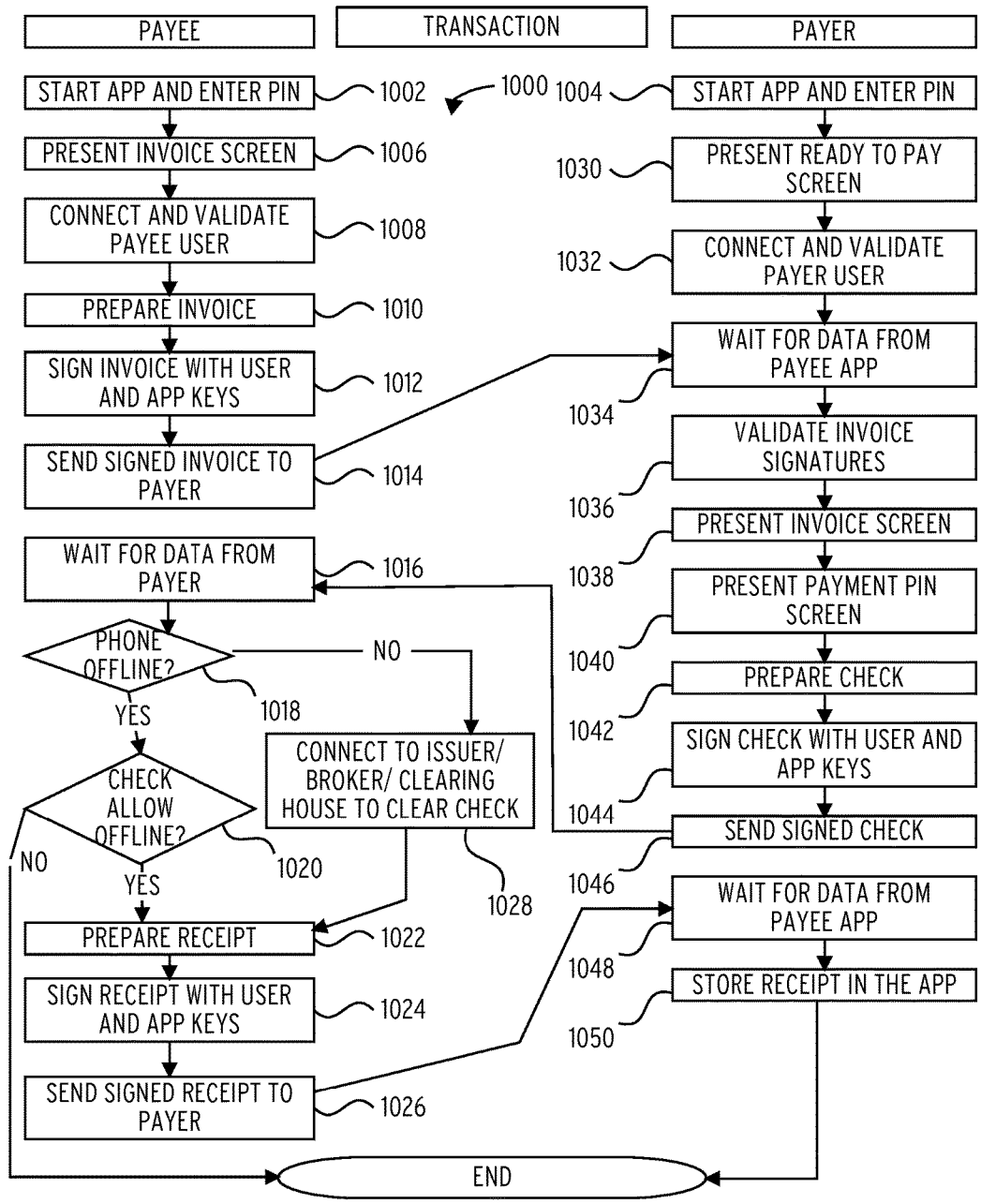
FIG. 10 is an exemplary method for conducting a peer to peer transaction, in accordance with one embodiment.

FIG. 10 is an exemplary method 1000 for conducting a peer to peer transaction, in accordance with one embodiment. As an option, the method 1000 may be carried out in the context of the details of any of the Figures disclosed herein. Of course, however, the method 1000 may be used in any desired environment. Further, any aforementioned definitions may equally apply to the description below.

In one embodiment, method 1000 provides an overview of the entire transaction process between a payee device and a payer device. Although only one payee device and one payer device are shown, it should be noted that any number of payee devices and payer devices may participate in the transaction.

As shown, on the payee device, an app may be started and pin may be entered. See Item 1002. Of course, in other embodiments, a security pass phrase, pattern, retina scan, and/or fingerprint scan may be used in place of the pin.

Next, an invoice screen may be presented. See item 1006. The invoice screen may include information associated with the transaction (e.g. name, location, merchandise, etc.).

In one embodiment, before payee can input information, a payee user may need to be connected and validated. See item 1008 (detailed in 900).

Next, an invoice may be prepared. See item 1010. For example, in one embodiment, the payee may input the amount, the type of merchandise and services, a code associated with the one or more items, and/or any other information invoice.

Next, the invoice may be signed with user and app keys associated with the payee. See item 1012. Next, the signed invoice may be sent to the payer. See item 1014. In this manner, app and user credentials/keys are sent from the payee device to the payer device.

On the payer side, an app may be started and a pin entered. See item 1004. Of course, in other embodiments, a security pass phrase, pattern, retina scan, and/or fingerprint scan may be used in place of the pin.

Next, a ready to pay screen may be presented. See item 1030. In one embodiment, the invoice screen (see item 1006) and the ready to pay screen (see item 1030) may both be associated with a transaction application. In one embodiment, the invoice screen item 1006 and the ready to pay screen item 1030 may be separate modules and/or features associated with the transaction application.

A shown, a payer user may be connected and validated. See item 1032 (detailed in 900).

Next, the payer waits for data from the payee app. See item 1034. For example, after the payer has signed into the application, the application may be in a state where it can receive data from another device to effectuate a transaction. As described hereinabove in item 1014, the signed invoice may be sent to the payer. Once it is received, the invoice signatures are validated. See item 1036.

In one embodiment, the validation may include validating the hardware address and the certificates associated with the invoice. Further, the payee and payer may use the app public key to send over each of their user credentials. In one embodiment, the user credentials may be encrypted using the app public key. As such, the validation may also include validating the user credentials.

If the invoice signatures are validated, an invoice screen is presented. See item 1038. In one embodiment, the invoice screen may reflect the information entered by the payee at item 1010.

Next, a payment pin screen may be presented. See item 1040. For example, in one embodiment, the pin screen may be used to further verify that the payer desires to proceed forward with the transaction and pay the requested amount.

As shown, a check may be prepared. See item 1042. Further, the check may be signed with user and app keys. See item 1044. In one embodiment, preparing the check may include using the amount and receipt ID as indicated on the invoice to generate a check. In another embodiment, a check identifier may be prepared along with the check for identification of the check.

Next, the signed check may be sent. See item 1046. As shown, the signed check is sent back to the payer's device, which has been waiting for data from the payer. See item 1016.

Next, it is determined whether the phone is offline. See decision 1018. If the phone is not offline, the payer device connects to issuer/broker/clearing house to clear the check.

See item 1028. If the issuer/broker/clearing house does clear the check, then a receipt is prepared. See item 1022. In one embodiment, clearing the check may include sending the check, the receipt, the check identification, and/or any other information which may be relevant to determining whether a check should be cleared.

In this manner, a check may be cleared instantly, and the transaction should proceed forward without any risk on the part of the payee.

If the phone is offline, then it is determined whether it is permissible to use the check offline. See decision 1020. If the check is not allowed to be used offline, then the transaction ends unsuccessfully. If the check can be used offline, then a receipt is prepared. See item 1022. In one embodiment, using this approach allows the payee to submit the check at a later time (when the payee can connect to the issuer/broker/clearing house to clear the check). In one embodiment, any risk involved in this type of transaction may be borne by the payee, although that is minimized, to the extent possible, through use of the user and app keys, as well as other security provisions implemented throughout this transaction process.

In one embodiment, preparing a receipt may include preparing a written electronic notification of the success of the transaction. Additionally, as shown, the receipt may be signed with user and app keys. See item 1024. The signed receipt is then sent to the payer. See item 1026.

On the payer's device, after having waited for data from the payee app (e.g. Item 1048), the the receipt may be received and stored in the app. See item 1050. After receiving and storing the receipt, the transaction may end.

Figure 11:
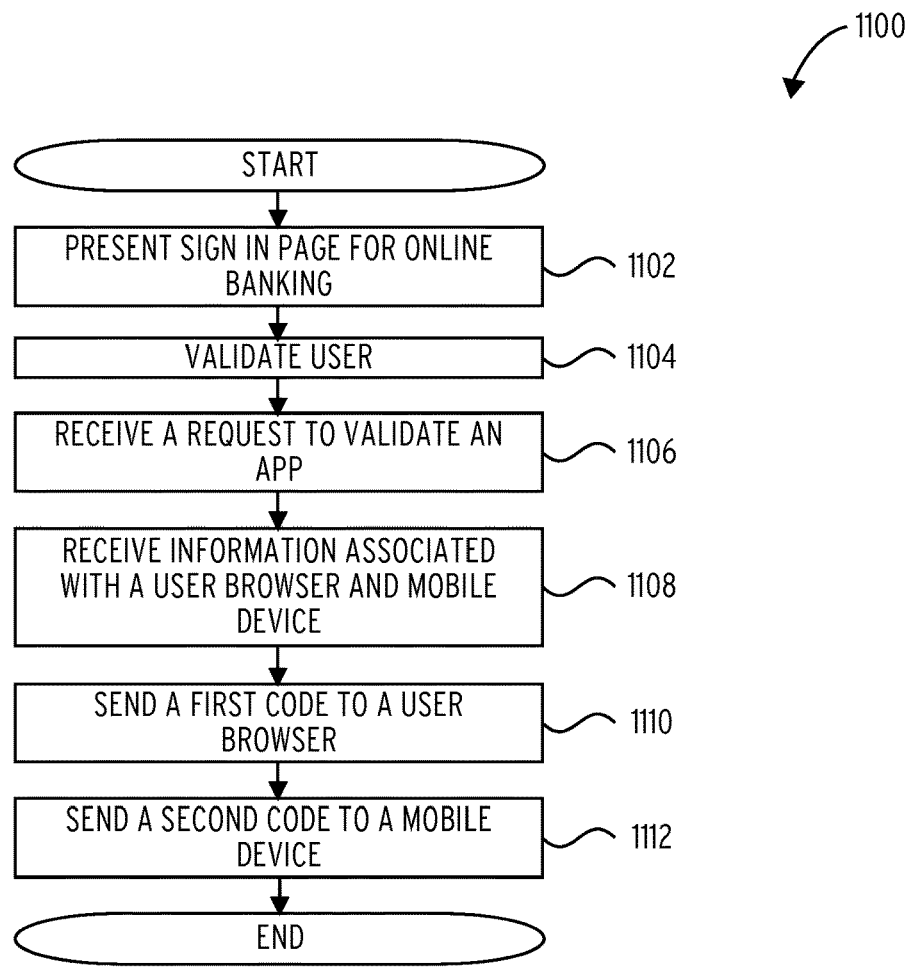
FIG. 11 is an exemplary method for validating a mobile device, in accordance with one embodiment.

FIG. 11 is an exemplary method 1100 for validating a mobile device, in accordance with one embodiment. As an option, the method 1100 may be carried out in the context of the details of any of the Figures disclosed herein. Of course, however, the method 1100 may be used in any desired environment. Further, any aforementioned definitions may equally apply to the description below.

As shown, a sign in page is presented for online banking. See item 1102. In various embodiments, the sign in page can be displayed on any device (e.g. mobile, desktop, etc.).

Next, the user is validated. See item 1104. For example, in one embodiment, the user may need to input information to validate the authenticity of the user (e.g. enter a secret pin, etc.).

As shown, a request to validate an app is received. See item 1106. As discussed hereinabove, the app may include a transaction app capable of effectuating a transaction between two or more devices.

Next, information associated with a user browser and mobile device may be received. See item 1108. For example, in one embodiment, the user may designate a location associated with the browser to deliver a random code (e.g. a specific webpage, a secure web portal, etc.). In another embodiment, after the user has successfully signed into the online system, the default may be to simply display a code in the browser of the online system. Additionally, information associated with the mobile device may be entered, including phone number, IMEI, and/or any other identification code which may be used to identify and send information to the mobile device.

Next, a first code is sent to a user browser. See item 1110. Additionally, a second code is sent to a mobile device. See item 1112. In one embodiment, the first code may be a random number, and the second code may be a random number. Additionally, in another embodiment, the second code may be sent as a SMS to the mobile device. Of course, in other embodiments, any other communication system may be used to send the second code to the mobile device.

Figure 12:
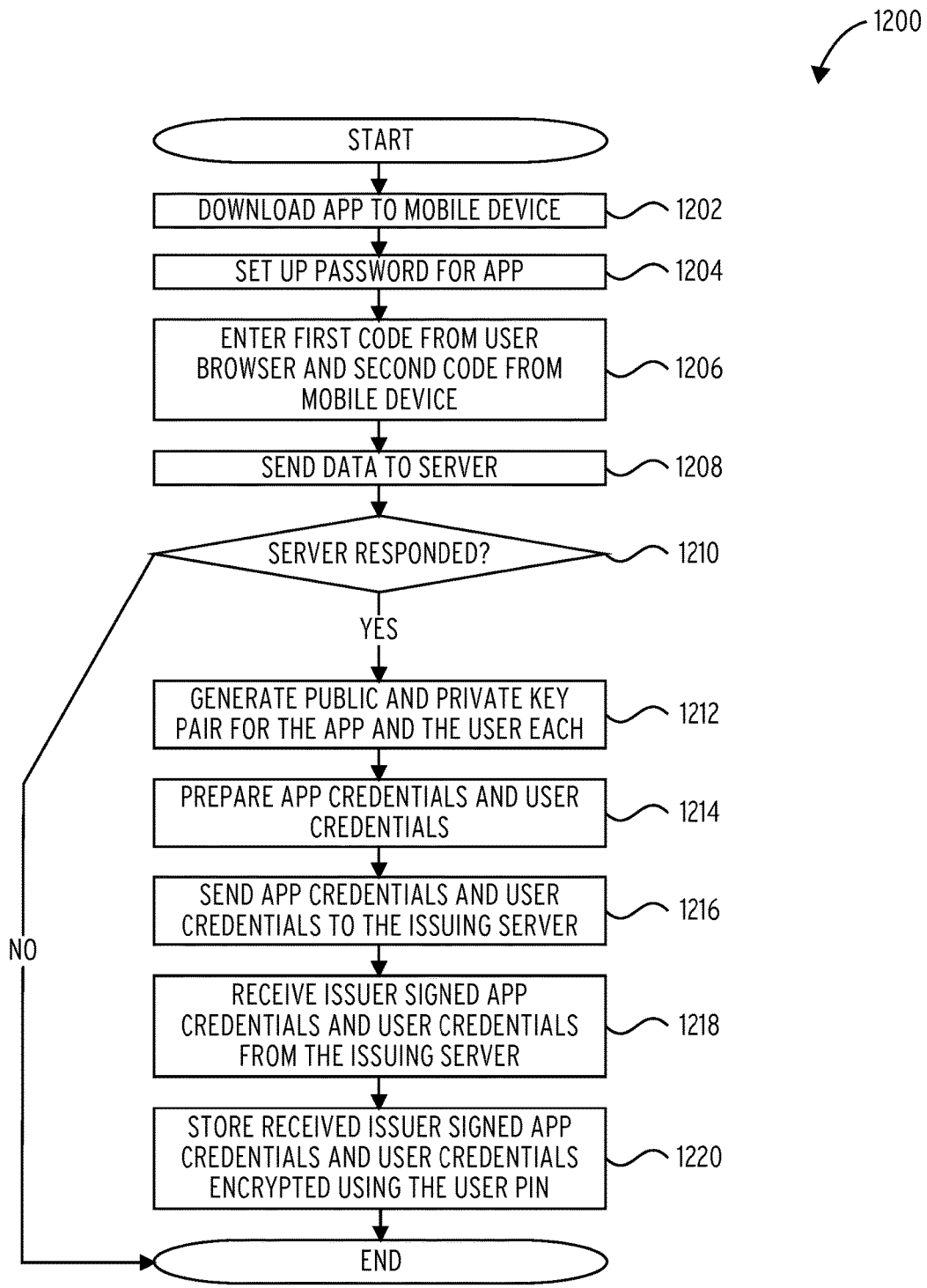
FIG. 12 is an exemplary method for validating a mobile device, in accordance with one embodiment.

FIG. 12 is an exemplary method 1200 for validating a mobile device, in accordance with one embodiment. As an option, the method 1200 may be carried out in the context of the details of any of the Figures disclosed herein. Of course, however, the method 1200 may be used in any desired environment. Further, any aforementioned definitions may equally apply to the description below.

As shown, an app may be downloaded to a mobile device. See item 1202. Additionally, a password may be set up for the app. See item 1204. In various embodiments, the app may be downloaded from any digital store where application are accessible.

In one embodiment, setting up the application may include adding in multi-factor login to the user's ID. For example, the user may add a multi-factor to a login ID to verify the identity of the user. In such an embodiment, the multifactor login may require multiple things to happen before a user can login (e.g. answer correctly to questions posed, enter correct PIN, enter SMS code, etc.).

Next, the information derived from FIG. 11 may be used. As shown, the first code from user browser and the second code from the mobile device may be entered. See item 1206.

Next, the data is sent to the server. See item 1208. Then, it is determined whether the server has responded. See decision 1210. If the server does not respond, then the process ends. If the server does respond, then a public and private key pair are generated for the application and the user each. See item 1212. In one embodiment, the generation of the public and private keys may occur using the Issuing Authority item 830 and/or item 832.

As shown, the app credentials and user credentials are prepared. See item 1214. In one embodiment, the app and user credentials may be prepared by the mobile application group item 804 and/or item 816. Additionally, in one embodiment, the app credentials may include unique app credentials identifier, bluetooth address, WiFi address, NFC chip serial number, ICCID, IMEI, and/or an application Public Key.

Next, the app credentials and user credentials are sent to the issuing server. See item 1216. In one embodiment, the issuing server signs the app credentials and user credentials and returns back the signature and certificate chain.

In one embodiment, the issuing server may also impose conditions on the user. For example, in on embodiment, based on a profile associated with the user and the user's transaction history, the issuing server may issue checks with an appropriate amount limit, offline amount limit, geo limits, valid time duration, etc.

As shown, the issuer signed app credentials and user credentials are received from the issuing server. See item 1218. In one embodiment, the issuer signed app credentials and user credentials may be received by the mobile application group item 804 and/or item 816.

Lastly, all received issuer signed app credentials and user credentials are stored and encrypted using the user pin. See item 1220. In this manner, all application data may be stored and protected by the user PIN, device ICCID, IMEI and/or other device data.

In other embodiments, such a transaction system may include a method of checking authenticity and validity of peer devices prior to invoking a peer-to-peer transaction. For example, in one embodiment, each peer device may be used to validate the other's authorization, originally given by each device's issuing authority, to use the device hardware for transactions with their respective mobile devices, by validating the device and user certificates assigned by it by its respective issuing authority.

Additionally, such a transaction system may include a method of managing transaction risk, under offline conditions, such that an issuing authority may issue digital checks wherein use of the digital check may be restricted by at least one of geo boundaries, a valid time period, a maximum permissible offline amount, and a device restriction. Additionally, in another embodiment, issued checks given to a user may be restricted for use based on at least one of assigned geographical boundaries, an expiration date, a maximum permissible amount, a particular and authorized device hardware, and/or a particular and authorized user(s).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, at an application stored on a first device, a first set of user data, the first set of user data including one or more of: a user identification, a password, at least a portion of a social security number associated with the user, at least a portion of an account number associated with an issuing authority, and an activation code;
   submitting the first set of user data to a server;
   generating a public-private key pair for the application and the user;
   preparing application credentials, the application credentials including at least one of: a unique identifier associated with the application credentials, the public key generated for the application, a version of the application, and a hardware address for a network connection;
   preparing user credentials, the user credentials including at least one of: a first name of the user, a last name of the user, the public key generated for the user, a unique personal identification number (PIN) assigned to the to the user by an issuing authority, and a photograph of the user;
   authenticating the user credentials and the application credentials;
   storing the user credentials and the application credentials;
   sending a copy of the application credentials and the user credentials to an issuing authority;
   receiving the copy of the application credentials and the user credentials authenticated by the issuing authority;
   storing the copy of the application credentials and the user credentials signed by issuing authority on the first device;
   wherein the user credentials and the application credentials are associated with an invoice;
   sending the user credentials and application credentials associated with the first device to a second device;
   in response to the sending, receiving a payment amount based on the invoice; and
   verifying whether the payment amount is approved of by a second issuing authority associated with the second device, wherein if the payment amount is approved, a receipt is prepared by the first device and sent to the second device, and if the payment is not approved, then the payment amount is not finalized;
   wherein the payment is associated with a digital check, and the digital check is restricted by at least one of geo boundaries, a valid time period, a maximum permissible offline amount, a user, or a device.

2. The method of claim 1, further comprising: receiving, at the application stored on the first device, information associated with a financial transaction, wherein the information associated with the financial transaction includes at least one of: an amount associated with a good or a service, a description associated with the good or the service, and a code associated with the good or the service.

3. The method of claim 2, further comprising:
   connecting, using a wireless connection, the first device to a second application stored on a second device, the second application being associated with user data of a second user;
   validating at least one of a hardware address and a certificate associated with the second device, wherein the validating includes verifying the authorization of the certificate by an issuing authority;
   sending, using the public key associated therewith, the user credentials and application credentials associated with the first device to the application of the second device;
   receiving user credentials and application credentials associated with the second application of the second device;
   validating the user credentials and application credentials associated with the second application of the second device; and
   displaying, using the first application of the first device, the user credentials associated with the second application of the second device.

4. The method of claim 1, wherein the invoice is sent to a second device, and in response, a payment associated with the second device is received at the first device.

5. The method of claim 4, wherein the payment includes a user signed key and an application signed key.

6. The method of claim 5, further comprising:
   validating the user signed key and the application signed key;
   determining whether the first device is offline;
   if the first device is offline, determining whether the payment allows for an offline transaction;
   if the payment allows for offline transaction, accepting the payment; and
   if the payment does not allow for offline transaction, not accepting the payment.

7. The method of claim 5, wherein the payment further includes a check identifier.

8. The method of claim 4, wherein the second device validates the user signed key and application key and further verifies the hardware address.

9. The method of claim 5, wherein the user signed key and application signed key are encrypted.

10. The method of claim 1, wherein the user credentials and the application credentials are encrypted.

11. The method of claim 10, wherein the encrypted user credentials and the encrypted application credentials are sent to a second device, wherein the second device decrypts and validates the user credentials and the application credentials.

12. The method of claim 5, wherein a mobile application is used on the second device to validate the user credentials and the application credentials, as well as to create the user signed key and the application signed key.

13. The method of claim 12, wherein the mobile application receives a manually inputted signature on the second device, the signature being displayed with the payment.

14. The method of claim 1, wherein a transaction occurs between the first device and at least one other device.

15. The method of claim 1, wherein the first device and at least one other device connect via at least one of WiFi, bluetooth, and NFC.

16. A computing apparatus including a processor and a memory storing instructions that, when executed by the processor, configure the apparatus to perform a method comprising:

receiving, at an application stored on a first device, a first set of user data, the first set of user data including one or more of: a user identification, a password, at least a portion of a social security number associated with the user, at least a portion of an account number associated with an issuing authority, and an activation code;

storing the first set of user data;

generating a public-private key pair for the application and the user;

preparing application credentials, the application credentials including at least one of: a unique identifier associated with the application credentials, the public key generated for the application, a version of the application, a hardware address for a network connection;

preparing user credentials, the user credentials including at least one of: a first name of the user, a last name of the user, the public key generated for the user, a unique personal identification number (PIN) assigned to the to the user by an issuing authority, and a photograph of the user;

authenticating the user credentials and the application credentials; storing the user credentials and the application credentials;

sending a copy of the application credentials and the user credentials to an issuing authority;

receiving the copy of the application credentials and the user credentials authenticated by the issuing authority;

storing the copy of the application credentials and the user credentials signed by issuing authority on the first device;

wherein the user credentials and the application credentials are associated with an invoice;

sending the user credentials and application credentials associated with the first device to a second device;

in response to the sending, receiving a payment amount based on the invoice; and verifying whether the payment amount is approved of by a second issuing authority associated with the second device, wherein if the payment amount is approved, a receipt is prepared by the first device and sent to the second device, and if the payment is not approved, then the payment amount is not finalized;

wherein the payment is associated with a digital check, and the digital check is restricted by at least one of geo boundaries, a valid time period, a maximum permissible offline amount, a user, or a device.

17. A non-transitory computer-readable storage medium having stored thereon instructions including instructions that, when executed by a processor, configure the processor to perform a method comprising:

receiving, at an application stored on a first device, a first set of user data, the first set of user data including one or more of: a user identification, a password, at least a portion of a social security number associated with the user, at least a portion of an account number associated with an issuing authority, and an activation code;

storing the first set of user data;

generating a public-private key pair for the application and the user;

preparing application credentials, the application credentials including at least one of: a unique identifier associated with the application credentials, the public key generated for the application, a version of the application, a hardware address for a network connection;

preparing user credentials, the user credentials including at least one of: a first name of the user, a last name of the user, the public key generated for the user, a unique personal identification number (PIN) assigned to the to the user by an issuing authority, and a photograph of the user;

authenticating the user credentials and the application credentials;

storing the user credentials and the application credentials;

sending a copy of the application credentials and the user credentials to an issuing authority;

receiving the copy of the application credentials and the user credentials authenticated by the issuing authority;

storing the copy of the application credentials and the user credentials signed by issuing authority on the first device;

wherein the user credentials and the application credentials are associated with an invoice;

sending the user credentials and application credentials associated with the first device to a second device;

in response to the sending, receiving a payment amount based on the invoice; and verifying whether the payment amount is approved of by a second issuing authority associated with the second device, wherein if the payment amount is approved, a receipt is prepared by the first device and sent to the second device, and if the payment is not approved, then the payment amount is not finalized;

wherein the payment is associated with a digital check, and the digital check is restricted by at least one of geo boundaries, a valid time period, a maximum permissible offline amount, a user, or a device.

\* \* \* \* \*